July 14, 1942.  J. R. GRAVES  2,289,835

PIVOT BEARING FOR RAIL TRUCKS

Filed Feb. 29, 1940  2 Sheets-Sheet 1

INVENTOR
John R. Graves
by his attorneys
Stebbins, Blenko & Parmelee

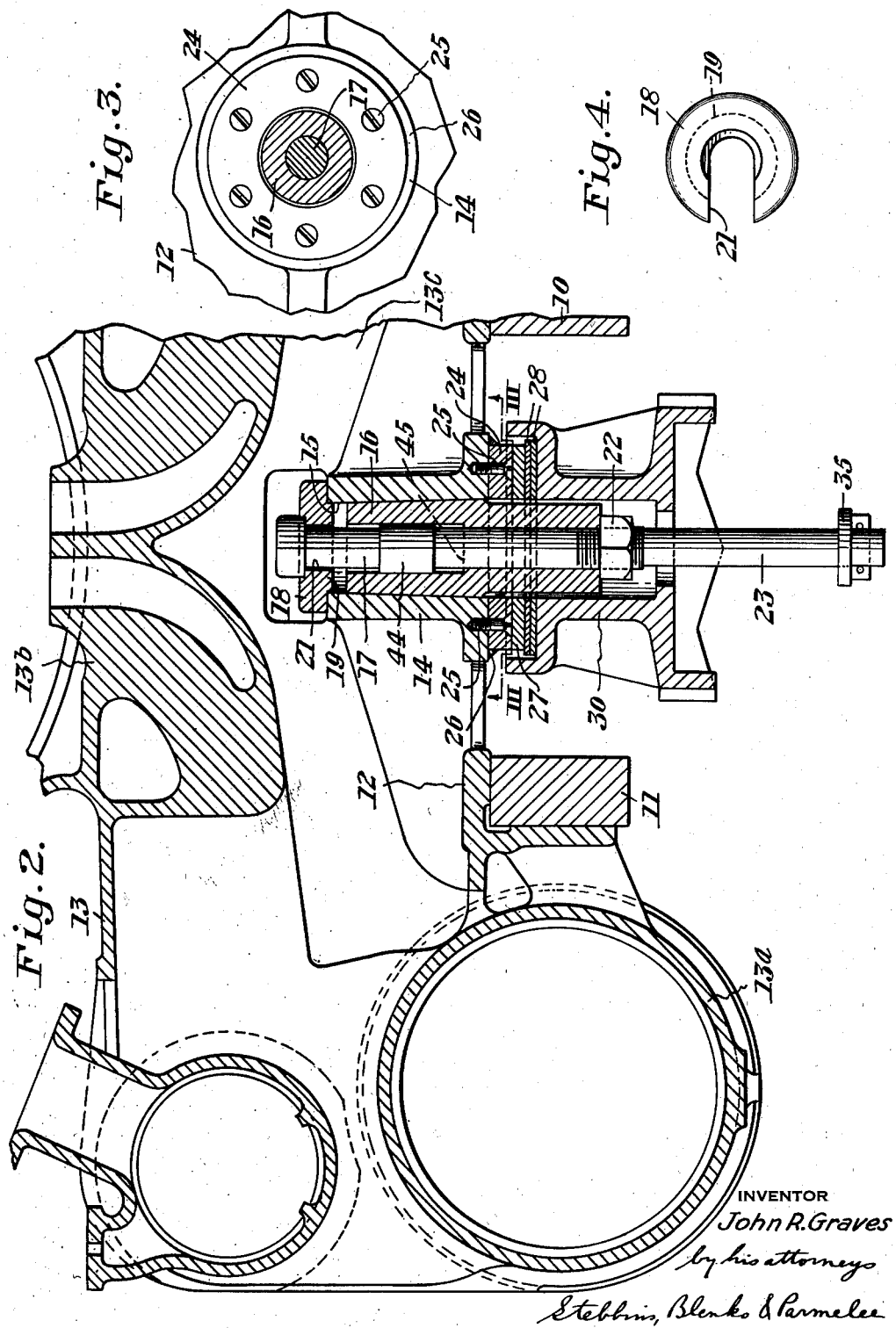

Patented July 14, 1942

2,289,835

UNITED STATES PATENT OFFICE 2,289,835

PIVOT BEARING FOR RAIL TRUCKS

John R. Graves, Yonkers, N. Y., assignor to Blaw-Knox Company, Pittsburgh, Pa., a corporation of New Jersey Application February 29, 1940, Serial No. 321,504

8 Claims. (Cl. 105—200)

This invention relates to a supporting truck for a vehicle and, in particular, to a truck which is pivoted to the vehicle frame.

Pivoted truck frames are used in various types of vehicles. One of the most troublesome applications thereof is afforded by the front truck of a steam locomotive. Similar trucks are employed at both ends of the usual electric locomotive. The service to which locomotive end trucks are subjected is very severe and the requirements imposed for the sake of safety are quite rigid.

In the first place, there is considerable movement in all directions between the locomotive frame and the end truck. Another factor is the shock to which the end truck is subjected on starting and stopping. These conditions have frequently resulted in loosening of bolted connections between the parts of pivotal truck mountings as constructed heretofore. In such constructions, furthermore, high stresses are produced by the heavy forces involved which act through substantial moment arms. As a result of such stresses, breakage of parts such as the cylinder casting of a steam locomotive has occasionally occurred.

I have invented a novel pivot bearing whereby an end truck may be securely anchored to the locomotive frame, without interfering with its freedom to rotate as required by the nature of the track traversed. In a preferred embodiment, the invention comprises a hollow pin having its upper end seated in a cross-tie forming part of the main vehicle frame. The lower end of the pin projects into a bolster mounted on the end truck, thereby providing for angular movement of the truck relative to the frame. Cooperating thrust bearing surfaces are provided on the cross-tie and bolster. The center pin itself is preferably hollow to receive a tie-bolt extending therethrough for holding the pin in proper position. I provide means for limiting downward movement of the pin in case of breakage of the tie-bolt. I also provide means for holding the bolt against dropping out, in case of breakage thereof.

Further features of novelty and advantage characterizing the invention will become apparent from the following detailed description which refers to the accompanying drawings illustrating the preferred embodiment briefly described above. In the drawings—

Fig. 2 is a transverse sectional view taken substantially along the plane of line II—II of Fig. 1;

Fig. 3 is a partial bottom plan view of the cross-tie showing one of the thrust bearing surfaces; and Fig. 4 is a plan view of a detail.

Figure 1:
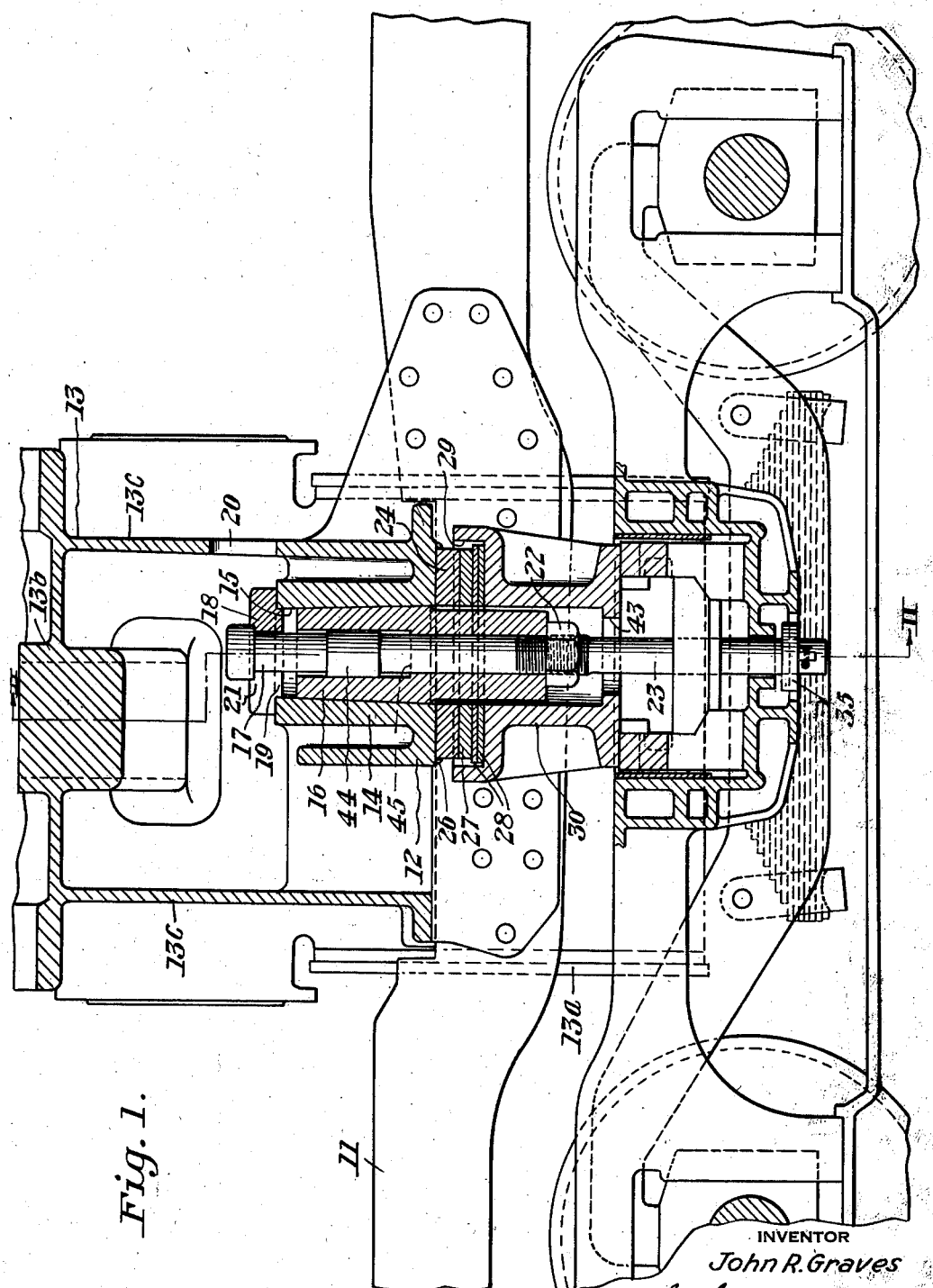
Fig. 1 is a longitudinal central section through a pivot bearing according to my invention.

The longitudinal members of a locomotive frame are indicated at 10 and 11. These members are connected adjacent one end by a cross-tie 12. In the case of a steam locomotive, this tie may conveniently form part of the main cylinder casting indicated generally at 13. The casting is bolted to the frame members 10 and 11 and includes cylinders 13a and a boiler pedestal 13b, connected by spaced webs 13c. A hub 14 formed in the cross-tie 12, extends upwardly into the hollow space below the pedestal 13b, and is provided with a tapered bore 15 converging upwardly. A hollow center pin 16 has its upper end tapered to fit in the bore 15. A king bolt 17 extends through the pin 16. The head of the bolt engages a slotted bearing collar 18 resting on the upper end of the hub 14 and having a shoulder 19 fitting into the hub. The rear wall 13c of the cylinder casting 13 is provided with an opening 20 whereby the collar 18 may be positioned on the bolt or removed therefrom. The slot in the collar 18, shown more particularly at 21 in Fig. 4, permits radial placement of the collar on the bolt and its removal therefrom. The shoulder 19 prevents lateral displacement of the collar so long as it is properly positioned on the hub 14.

A nut 22 threaded on the bolt 17 bears against the lower end of the pin 16 to force it into the bore 15 and hold it therein. By means of the taper fit between the pin and the bore, the pin is held in rigidly fixed position relative to the cross-tie 12. The taper fit is preferred because of the ease of assembly with this construction, but is not essential, however, since a press fit between truly cylindrical surfaces would provide equally rigid support for the center pin 16. The bolt 17 has a reduced extension 23 depending therefrom, the purpose of which will appear shortly.

A hardened steel thrust bearing ring 24 is secured to the lower face of the hub 14 by countersunk screws 25 and is welded thereto as at 26. The fixed ring 24 cooperates with rings 27 and 28 seated in a cup 29 formed on a swing bolster 30. The swing bolster 30 is in the form of a ribbed hub into which the lower end of the pin 16 projects. The load on the cross-tie 12 is transmitted to the swing bolster 30 through the bearing plates 26, 27 and 28, the movable bearing plates permitting rotation of the bolster about the pin 16. As shown in the drawings, suitable clearance is provided between the lower end of the pin 16 and the bore through the swing bolster 30.

The swing bolster 30 is the only part of the truck assembly with which the present invention is concerned, all of the construction below the base of bolster 30 being merely representative of well-known construction which it is not necessary to describe. The extension 23 from the bolt 17 extends downwardly through the truck and is provided with a collar 35 secured thereto by a key, to prevent separation of the truck from the cross-tie.

As is well known in the art, the front truck of a locomotive usually comprises one or more pairs of wheels assembled in a frame, supporting through springs, equalizer, rockers and auxiliary members, a swing bolster which has the necessary freedom of movement respecting the truck frame to assume a position and alinement in cooperation with the parts connecting it to the locomotive frame. The invention is not concerned with the construction of the truck and the manner in which the swing bolster is supported, except insofar as it requires somewhat less space than prior construction and may provide more headroom under the swing bolster, permitting strengthening the truck frame and allowing more space for brakes, as will presently appear. However, any preferred type of truck construction and support for the swing bolster may be used, and the invention may be readily applied to existing trucks. In case the invention is applied to an existing truck, a new swing bolster only is required, adapted to the center pin assembly of the invention, the remaining parts requiring no changes.

The bore through the swing bolster 30 is stepped at 43 to a diameter less than that of the lower end of the pin 16, to prevent the latter from dropping out should the bolt 17 break. The bolt itself is provided with a shoulder 44 adapted to engage a restriction 45 in the bore through the pin, to prevent the bolt from falling down in case of breakage.

The center pin bearing described above is assembled by inserting the pin 16 and bolt 17 from below and inserting the collar 18 through opening 20, in position to engage the bolt head. The nut 22 is then tightened on the bolt. The bearing ring 24 is then put in place and secured as previously described and the truck with the swing bolster 30 thereon is raised onto the lower end of the pin 16 after placing the bearing rings 27 and 28 in position. The collar 35 is then put on the bolt extension 23 and keyed thereto. The invention may be applied to existing trucks merely by providing a bolster therefor such as that shown at 30. The construction of the truck itself, apart from the bolster 30, may be of any desired type.

It will be apparent that the pivot bearing construction described is characterized by numerous advantages over pivotal truck mountings known heretofore. The usual center plate ordinarily bolted to the cross-tie is not required, eliminating this troublesome connection. The hollow pin 16 constitutes a radial bearing for the truck and the faces of the hub 14 and bolster 30, with the bearing rings therebetween, constitute a thrust bearing. Both the radial and thrust bearing are immediately adjacent the cross-tie, thereby reducing the moment arm through which forces transmitted by the bearing are effective.

I utilize the space below the boiler pedestal in a conventional cylinder casting as an anchorage for a pivot-pin assembly insertible from below and secured from above. This enables me to raise the bearing and eliminate the usual center plate.

The construction is well adapted to stand the heavy shocks to which it is normally subjected in service and may be made strong and durable to comply with the rigid safety requirements. Breakage of the main pivot pin or the tie-bolt does not result in disconnection of the truck and provision is made for preventing complete separation of the parts in case of such breakage. The fixed bearing ring 24 is rigidly secured to the cross-tie so that no looseness therebetween can develop. Thus, practically all the wear in the thrust bearing is confined to the movable rings 27 and 28 which can be easily replaced. The truck may easily be removed for repairs or adjustment of the pin by removing the collar 35. The truck may then be dropped clear of the extension 23 of the bolt 17. The center pin may easily be adjusted to take up any looseness. The bolt 17 is under no tension except that necessary to hold the pin in place. The center pin may be withdrawn if desired, by any convenient means.

It will be understood that although I have described the invention as applied to the front truck of a steam locomotive, it may also be applied to other types of locomotives or to other vehicles as well. In such applications, the hub in which the center pin is seated should be formed on a cross member of the main frame. In the case of steam locomotives, as stated herein, this may conveniently be the main cylinder casting. Other changes in the construction and arrangement of parts may also be made without departing from the spirit of the invention or the scope of the appended claims.

I claim:

1. A pivot bearing for a vehicle truck comprising a hollow pin having its upper end received in a vertical hub in the frame of the vehicle, a bolt extending axially through said pin and effective normally to hold it in said hub, a truck bolster having a hub into which said pin projects, said hub providing a thrust bearing intermediate the ends of said pin, and a bearing collar slotted for radial placement on or removal from the bolt, said collar resting on said first-mentioned hub, thereby supporting said bolt, said collar and first-mentioned hub having interengaging surfaces effective to prevent radial removal of the collar from the bolt when the collar is seated on said first-mentioned hub.

2. A pivot bearing for a vehicle truck comprising a hollow pin having its upper end received in a vertical hub in the frame of the vehicle, a bolt extending axially through said pin and effective normally to hold it in said hub, a truck bolster having a hub into which said pin projects, said hubs providing a thrust bearing intermediate the ends of said pin, and a bearing collar slotted for radial placement on or removal from the bolt, said collar resting on said first-mentioned hub, thereby supporting said bolt, and having a shoulder adapted to enter the bore in said first-mentioned hub.

3. In a locomotive cylinder casting including a boiler pedestal and spaced transverse webs, a cross tie having a central hub projecting upwardly between said webs into the space below said pedestal, said hub being adapted to receive a center pin assembly for a pilot truck on insertion from below, one of said webs having an opening adjacent the top of said hub, and a collar insertible through said opening, disposable radially onto said pin assembly, and engaging the top of said hub to support the assembly therein.

4. In a pivot connection between a wheeled truck and a rail vehicle, the combination with a truck bolster, of a hollow center pin depending from the vehicle and telescoping into the bolster, and a king bolt extending through the center pin and normally securing it rigidly to the vehicle, the internal portion of the bolster and center pin being stepped to cooperate with shoulders on the pin and bolt respectively, whereby the pin telescopes into the hub and the bolt into the pin on failure of normal support for the bolt and pin.

5. A pivot bearing for a vehicle truck comprising a hollow pin having its upper end received in a vertical hub in the frame of the vehicle, a bolt extending axially through said pin and effective normally to hold it in said hub, a truck bolster having a hub into which said pin projects, said bolster hub being stepped below the bottom of said pin to arrest the fall of the latter on failure of said bolt, said hubs cooperating to form a thrust bearing intermediate the ends of said pin, and unitary means disposable under the bolt head after the assembled bolt and pin have been inserted upwardly through said hubs, said means bearing on said first-mentioned hub and thereby supporting said bolt and pin.

6. A pivot bearing for a vehicle truck comprising a hollow pin having its upper end received in a vertical hub in the frame of the vehicle, a bolt extending axially through said pin and effective normally to hold it in said hub, a truck bolster having a hub into which said pin projects, said hubs constituting a thrust bearing intermediate the ends of said pin, and a bearing collar slotted for radial placement on or removal from the bolt, said collar resting on said first-mentioned hub, said collar and first-mentioned hub having interengaging surfaces preventing radial removal of the collar when seated on the hub.

7. A pivot bearing for a vehicle truck comprising a hollow pin having its upper end received in a vertical hub in the frame of the vehicle, a bolt extending axially through said pin and effective normally to hold it in said hub, a truck bolster having a hub into which said pin projects, said hubs cooperating to form a thrust bearing intermediate the ends of said pin, a shoulder on said bolt spaced from the head thereof and a step on the interior of said pin adapted to engage said shoulder and limit downward movement of the lower portion of the bolt on failure of the bolt between said shoulder and the head of the bolt.

8. In a locomotive cylinder casting, integral steam cylinders, boiler pedestal, and cross-tie, an integrally cast hub projecting above said cross-tie into the space below said boiler pedestal, a vertical tapered bore in said hub adapted to receive a tapered center pin when inserted therein, a bearing surface on the upper end of said hub, and an opening in the wall of said pedestal adjacent said bearing surface, through which laterally removable anchorage means may be applied to said surface to support the center pin therefrom.

JOHN R. GRAVES.